Aug. 13, 1957 W. E. ALLEN 2,802,440
DEGREE LAYOUT AND FIT-UP TABLE
Filed March 29, 1954 3 Sheets-Sheet 1
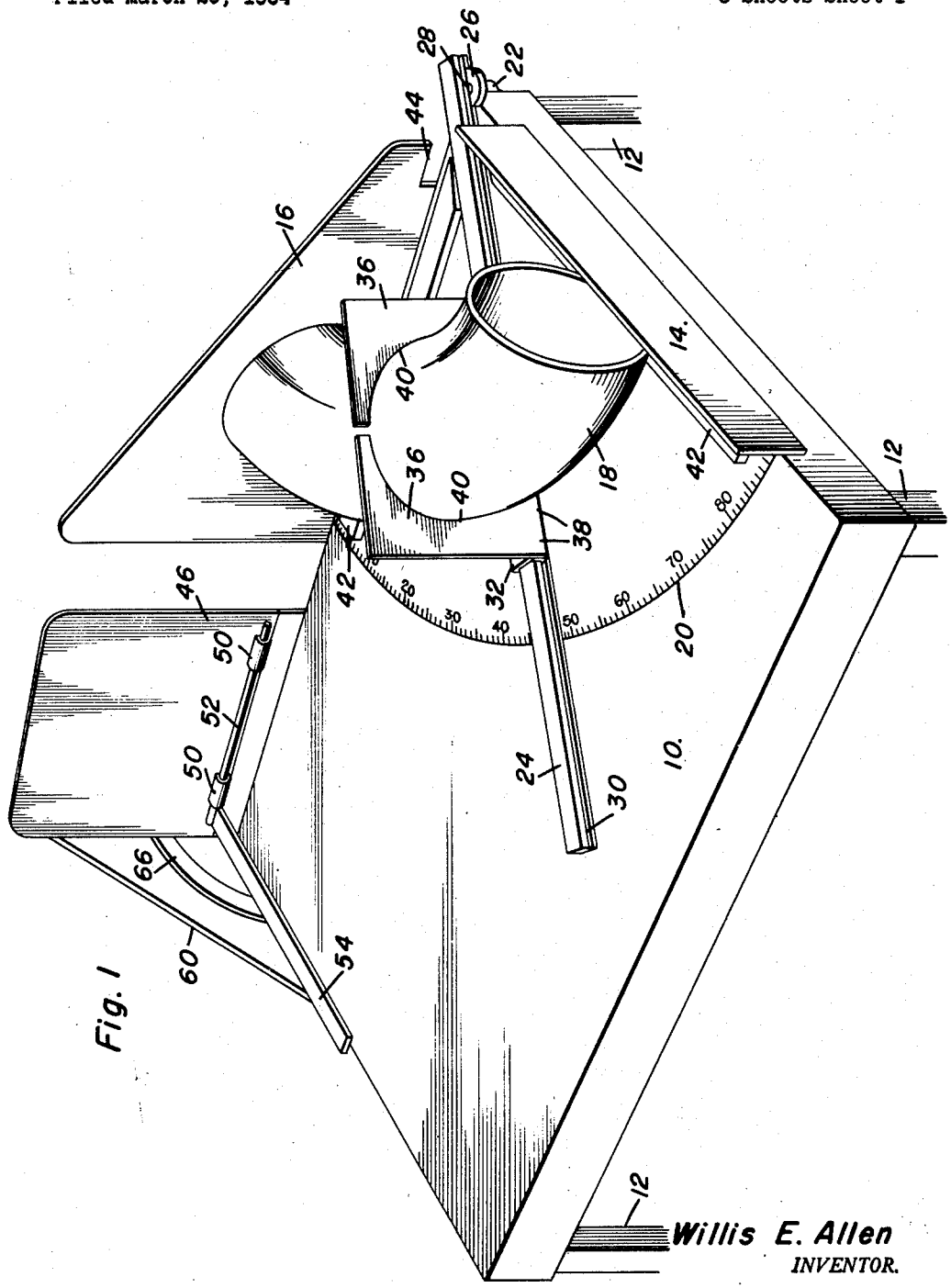
Fig. I
Willis E. Allen
INVENTOR.
BY

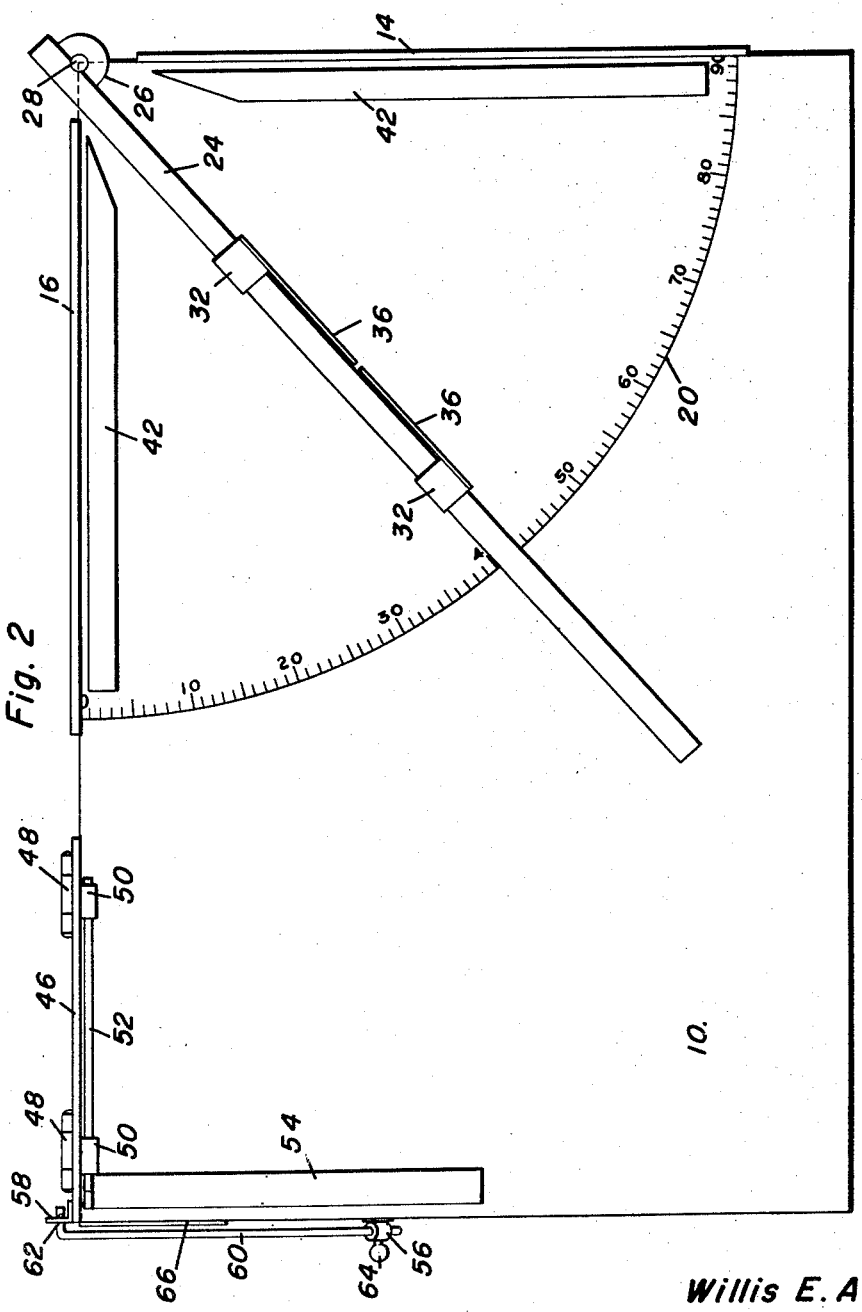

Aug. 13, 1957  W. E. ALLEN  2,802,440
DEGREE LAYOUT AND FIT-UP TABLE
Filed March 29, 1954  3 Sheets-Sheet 3
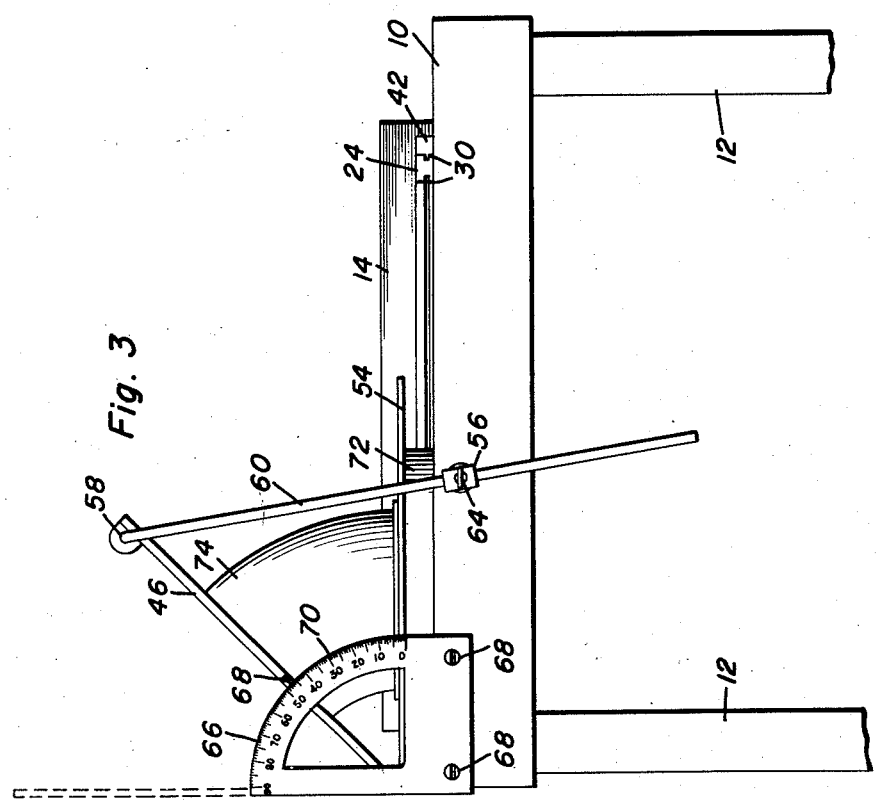
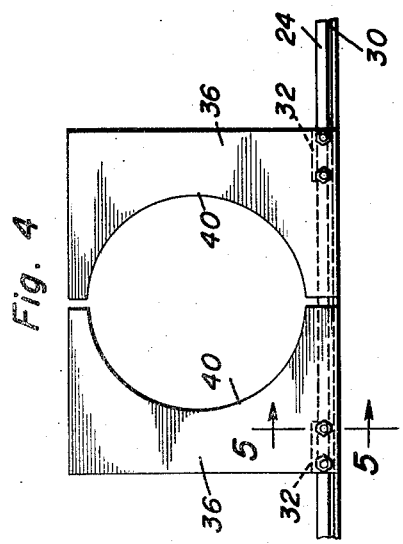
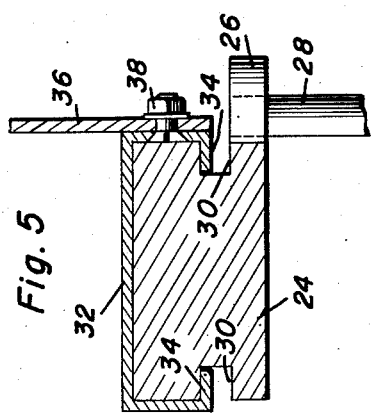
Willis E. Allen
INVENTOR.

United States Patent Office 2,802,440
Patented Aug. 13, 1957

2,802,440

DEGREE LAYOUT AND FIT-UP TABLE

Willis E. Allen, Tulsa, Okla.

Application March 29, 1954, Serial No. 419,487

1 Claim. (Cl. 113—102)

This invention relates to a degree layout and fit-up table and more particularly to a table for use by pipe fitters or the like for cutting off pipe at a desired angle and for maintaining pieces of pipe in desired positions while tack welding the same.

An object of this invention is to provide a degree layout and fit-up table wherein the table is provided with means for retaining a pipe in a preselected position thereon while marking the same for cutting purposes.

Another object of this invention is to provide a degree layout and fit-up table wherein various elbows can be placed in position on the table and marked so as to be cut at a different angle.

A further object of this invention is to provide a degree layout and fit-up table having novel means thereon for forming a scribing guide for marking a pipe.

A yet further object of this invention is to provide a degree layout and fit-up table wherein means are provided for properly positioning two elements so that the same may be tack welded in proper position prior to the final welding operation.

A still further object of this invention is to provide a degree layout and fit-up table which is simple and efficient in construction, and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the degree layout and fit-up table forming the subject of this invention with a piece of pipe shown mounted on the table for marking purposes;

Figure 2 is a top plan view of the degree layout and fit-up table forming the subject of this invention;

Figure 3 is an end elevational view of the degree layout and fit-up table forming the subject of this invention with a piece of pipe mounted in position for assembling purposes;

Figure 4 is a side elevational view of the templates mounted in position on the guide bar; and Figure 5 is a sectional view taken substantially along the section line 5—5 of Figure 4.

Referring now more particularly to the accompanying drawings, it will be seen that the improved degree layout and fit-up table forming the subject of this invention includes a bed 10 supported by a plurality of legs 12. The bed 10 is substantially rectangular in shape and the legs 12 are secured to the corners thereof.

Secured to the bed 10 in any suitable manner and extending upwardly therefrom are a pair of retaining plates 14 and 16. The plates 14 and 16 are mounted on adjacent sides of the bed 10 and have their adjacent ends spaced from each other and from the associated corner of the bed 10. The plates 14 and 16 extend above the bed 10 a sufficient distance so as to form a bearing surface for engaging the ends of a pipe 18 disposed thereon in a horizontal position.

The bed 10 is provided with a graduated arc 20 disposed thereon in any suitable manner. The arc 20 may be printed directly on the bed 10 or may be imprinted on a suitable element which is secured to the bed 10. The arc 20 is marked off in degrees with the degrees starting at the inner face of plate 16 and having the 90° mark terminating adjacent the inner face of the plate 14.

A bracket 22 is adapted to be secured to the corner of the bed 10 which is between the adjacent ends of the plates 14 and 16. A longitudinally extending member 24 is provided with an ear 26 extending from one side thereof adjacent one end. A pin 28 extends through the ear 26 and is adapted to be received in the bracket 22 for pivotally mounting the member 24 on the bed 10.

The member 24 is formed with a horizontally disposed groove 30 running along each side thereof. The grooves 30 on opposite sides of the member 24 are in alignment with each other. A pair of slides 32 are formed in substantially U-shaped configuration with inwardly extending flanges 34 extending toward each other from the free ends of the leg portions of the member. The slides 32 are adapted to be positioned on the member 24 with the flanges 34 disposed in the slots 30. Thus, it will be seen that the slides 32 are capable of longitudinal movement with respect to the member 24 but are not capable of transverse movement with respect thereto. Each of the slides 32 is adapted to support a template 36 for sliding movement with respect to the member 24. Each of the templates 36 is suitably secured by means of a fastener 38 to one of the leg portions of the slides 32. The template 36 extends above the slide 32 and is provided with a cut-out portion 40 along one side thereof which cut-out portion is in the form of a semi-circle. When the two slides 32 and their associated templates 36 are placed in position on the member 24, they are moved from opposite ends of the member 24 so that the sides of the templates having the cut-out portions 40 are in engagement with each other. This will provide a circular opening which is adapted to receive a pipe therein so that when the member 24 is adjusted to the desired angle and the pipe is positioned between the templates, the pipe can be marked by using the templates as a guide.

The templates are to be mounted on the side of the member 24 from which the ear 26 extends. The center line of the pin 28 is in alignment with the vertical plane through the templates 36 so that the templates will always be positioned at the proper angle.

Inasmuch as the member 24 extends above the bed 10, the placing of a pipe on the table would cause the same to rock about the member 24 inasmuch as the ends of the pipe would not be supported. In order to prevent such a rocking movement, suitable bars 42 are provided adjacent the plates 14 and 16 and extend above the bed 10 a distance equal to the height of the member 24. Then, when the pipe is placed in position on the bed with its ends resting on the bars 42, the same will be retained against rocking movement thereon.

In order to allow the member 24 to be moved to a position whereby a very small angle can be cut therefrom, the plate 16 is provided with a cut-out portion 44 adjacent the corner of the bed 10 to which the member 24 is pivoted. This cut-out portion 44 is adapted to receive the member 24 therein when the same is to be moved to a position for cutting off a small amount of the pipe.

In practical use of the device thus far described, a suitable elbow is placed in position on the bed 10 with its ends resting on the bars 42 and with the edges in abutting relation to the plates 14 and 16. Then, templates 36 having the desired radius cut-out portions 40 are mounted on the slides 32 and the slides 32 are inserted from opposite angles on the member 24. Then, the member 24 is adjusted to the desired angle and the templates 36 moved into engagement with the pipe 18. Then, a line may be drawn with a soapstone or the like on the pipe 18, using the templates 36 as a giude. Then, the templates and the pipe can be removed from the bed and the pipe cut along the line.

After an elbow has been cut to a desired angle, it is usually desirable to attach a flange thereto so that the elbow can be connected into a system of pipes. In order to provide means whereby the flange can be properly attached to the elbow, there is provided at the side of the bed 10 having the plates 16 secured thereto a plate 46 which is pivotally secured by means of hinges 48 to the bed 10. The plate 46 is disposed adjacent the end of bed 10 opposite the pivotal connection of the member 24 thereto. Secured to the plate 46 and extending inwardly therefrom in overlying relationship to the bed 10 are a pair of ears 50. The ears 50 are provided with apertures extending therethrough which are in horizontal alignment with each other. Extending through the apertures in the ears 50 is a rod 52 which has secured to one end thereof a bar 54. The bar 54 extends perpendicular to the rod 52 and parallel to a side edge of the bed 10. The rod 52 is freely rotatable within the ears 50 so that the bar 54 may be moved about the horizontal axis of the rod 52.

In order to maintain the plate 46 in a selected adjusted position, the side of bed 10 which is parallel and adjacent to the bar 54 is provided with a collar 56 which is pivotally secured thereto. The face of plate 46 which is away from the bed 10 is provided with an ear 58 fixedly secured thereto and adjacent one corner thereof. A shaft 60 is provided with an offset portion 62 which is rotatably received in the ear 58. The other end of the shaft 60 is received in the collar 56. A suitable setscrew 64 is mounted on the collar 56 whereby the shaft 60 may be retained in adjusted position with respect to the collar 56.

Secured to the end of bed 10 having the collar 56 secured thereto is a vertically extending graduated quadrant 66. Suitable fasteners 68 may be used for securing the quadrant 66 to the bed 10. The end of plate 46 is provided with a pointer 68 painted thereon, or attached in any other suitable manner, which cooperates with the degree marking 70 on the quadrant 66 for indicating the angular position of the plate 46 with respect to the bed 10.

In practical use of the plate 46, after the elbow has been cut for the desired angle, the plate 46 is adjusted to the desired angle and a flange 72 is placed on the cut piece of pipe 74, and the two are then moved under the plate 46. The piece of pipe 74 is rotated until it properly aligns with the plate 46 and the bed 10. Then, the flange 72 is rotated until the holes therein become aligned with the bar 54. Then, the pipe 74 may be tack welded to the flange 72 prior to the finished welding.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In combination, a table comprising a bed, means on said table for retaining a pipe in preselected vertical position including a solid plate pivotally secured to said bed along one edge adjacent a corner thereof, said plate being pivotal about a horizontal axis, means pivoted to said plate and slidably connected to said bed for securing said plate in a selected adjusted position, and means mounted on said bed and cooperating with said plate for indicating the position of said plate, said plate being provided with means secured thereto for positioning an article in alignment therewith, said positioning means including a pair of ears secured to said plate, said ears being horizontally aligned and provided with aligned apertures, a rod rotatably mounted in the apertures in said ears, one end of said rod being provided with a bar secured thereto and extending perpendicular therefrom.

References Cited in the file of this patent

UNITED STATES PATENTS

| 279,336 | Clark | June 12, 1883 |
| 1,393,125 | Henon | Oct. 11, 1921 |
| 1,778,981 | McLaughlin | Oct. 21, 1930 |
| 1,940,910 | Hickey | Dec. 26, 1933 |
| 2,269,946 | Lange | Jan. 13, 1942 |
| 2,326,447 | Enderson | Aug. 10, 1943 |
| 2,464,444 | Gantz | Mar. 15, 1949 |
| 2,524,168 | Harnish | Oct. 3, 1950 |
| 2,648,896 | Krumm | Aug. 18, 1953 |
| 2,659,981 | Beckham | Nov. 24, 1953 |